US008631071B2

(12) United States Patent
Coldicott et al.

(10) Patent No.: US 8,631,071 B2
(45) Date of Patent: Jan. 14, 2014

(54) RECOGNITION OF AND SUPPORT FOR MULTIPLE VERSIONS OF AN ENTERPRISE CANONICAL MESSAGE MODEL

(75) Inventors: Peter Alan Coldicott, Jonestown, TX (US); Harry Thomas Pendergrass, Aloha, OR (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 12/640,865

(22) Filed: Dec. 17, 2009

(65) Prior Publication Data

US 2011/0153767 A1  Jun. 23, 2011

(51) Int. Cl.
  *G06F 15/16*   (2006.01)
  *G06F 15/173*  (2006.01)
(52) U.S. Cl.
  USPC .......... 709/204; 709/201; 709/202; 709/203; 709/217; 709/218; 709/219; 709/226
(58) Field of Classification Search
  None
  See application file for complete search history.

(56) References Cited

U.S. PATENT DOCUMENTS

| | | | |
|---|---|---|---|
| 6,256,773 B1 | 7/2001 | Bowman-Amuah | |
| 6,300,947 B1 * | 10/2001 | Kanevsky | 715/866 |
| 6,539,396 B1 | 3/2003 | Bowman-Amuah | |
| 6,658,644 B1 | 12/2003 | Bishop et al. | |
| 6,799,174 B2 | 9/2004 | Chipman et al. | |
| 7,080,064 B2 | 7/2006 | Sundaresan | |
| 7,099,859 B2 | 8/2006 | Sundaresan | |
| 7,103,871 B1 | 9/2006 | Kirkpatrick et al. | |
| 7,225,241 B2 | 5/2007 | Yada | |
| 7,284,196 B2 * | 10/2007 | Skeen et al. | 715/234 |
| 7,313,575 B2 * | 12/2007 | Carr et al. | 1/1 |
| 7,318,055 B2 | 1/2008 | Britton et al. | |
| 7,366,706 B2 | 4/2008 | Chang et al. | |
| 7,412,457 B2 | 8/2008 | Saracco et al. | |
| 7,428,582 B2 * | 9/2008 | Bean et al. | 709/218 |
| 7,483,973 B2 | 1/2009 | An et al. | |
| 7,526,501 B2 | 4/2009 | Albahari et al. | |
| 7,546,295 B2 | 6/2009 | Brave et al. | |

(Continued)

FOREIGN PATENT DOCUMENTS

WO    2007113164    10/2007

OTHER PUBLICATIONS

Justin Kelleher, "A Reusable Traceability Framework Using Patterns", University of Cape Town, ACM Digital Library, 2005, pp. 50-55.

(Continued)

*Primary Examiner* — Thu Nguyen
*Assistant Examiner* — Angela Widhalm
(74) *Attorney, Agent, or Firm* — Patents on Demand P.A.; Brian K. Buchheit; Scott M. Garrett

(57) ABSTRACT

A method of recognizing and supporting multiple versions of a canonical message model in a service oriented architecture industry model repository comprising determining differences between at least one first version of a message model and at least one other version of the message model; mapping the differences between the different versions of the message models to the SOA IMR; and providing the mapping of the differences between the message models to a message access service, mapping of differences between the message models are applied and updated to the later of the message models to support the versions of the canonical message models seamlessly.

19 Claims, 8 Drawing Sheets

(56) References Cited

U.S. PATENT DOCUMENTS

| | | | |
|---|---|---|---|
| 1,260,565 A1 | 10/2009 | Coldicott et al. | |
| 7,698,398 B1* | 4/2010 | Lai | 709/223 |
| 7,711,836 B2* | 5/2010 | Videlov et al. | 709/230 |
| 7,716,279 B2* | 5/2010 | Savchenko et al. | 709/203 |
| 7,761,533 B2* | 7/2010 | Angelov | 709/217 |
| 7,769,877 B2* | 8/2010 | McBride et al. | 709/230 |
| 7,865,820 B2* | 1/2011 | Sauer et al. | 715/234 |
| 7,890,517 B2* | 2/2011 | Angelo et al. | 707/752 |
| 7,979,840 B2 | 7/2011 | Zhang et al. | |
| 7,987,163 B2* | 7/2011 | Keshavarz-Nia et al. | 707/694 |
| 8,015,541 B1 | 9/2011 | Srinivasan et al. | 717/104 |
| 8,024,425 B2* | 9/2011 | Stoyanova | 709/218 |
| 8,074,117 B2* | 12/2011 | Wolf et al. | 714/38.1 |
| 8,156,179 B2* | 4/2012 | Parmar et al. | 709/203 |
| 8,229,881 B2* | 7/2012 | Pedro et al. | 707/600 |
| 8,234,387 B2* | 7/2012 | Bradley et al. | 709/229 |
| 2002/0069102 A1 | 6/2002 | Vellante et al. | |
| 2002/0073106 A1 | 6/2002 | Parker et al. | |
| 2002/0194053 A1 | 12/2002 | Barrett et al. | |
| 2003/0009740 A1 | 1/2003 | Lan | |
| 2003/0135825 A1* | 7/2003 | Gertner et al. | 715/513 |
| 2003/0172368 A1* | 9/2003 | Alumbaugh et al. | 717/106 |
| 2003/0229529 A1* | 12/2003 | Mui et al. | 705/8 |
| 2003/0233631 A1 | 12/2003 | Curry et al. | |
| 2004/0172612 A1 | 9/2004 | Kasravi et al. | |
| 2004/0193476 A1 | 9/2004 | Aerdts | |
| 2005/0050311 A1 | 3/2005 | Joseph et al. | |
| 2005/0050549 A1 | 3/2005 | Joseph et al. | |
| 2005/0138113 A1 | 6/2005 | Brendle et al. | |
| 2005/0166178 A1 | 7/2005 | Masticola et al. | |
| 2005/0268326 A1* | 12/2005 | Bhargavan et al. | 726/1 |
| 2005/0278202 A1 | 12/2005 | Broomhall et al. | |
| 2006/0015489 A1 | 1/2006 | Probst et al. | |
| 2006/0047810 A1 | 3/2006 | Herzog et al. | |
| 2006/0070083 A1 | 3/2006 | Brunswig et al. | |
| 2006/0074980 A1* | 4/2006 | Sarkar | 707/104.1 |
| 2006/0174222 A1 | 8/2006 | Thonse et al. | |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2007/0038610 A1* | 2/2007 | Omoigui | 707/3 |
| 2007/0073663 A1 | 3/2007 | McVeigh et al. | |
| 2007/0112712 A1 | 5/2007 | Flinn et al. | |
| 2007/0156726 A1* | 7/2007 | Levy | 707/100 |
| 2007/0239768 A1 | 10/2007 | Quinn-Jacobs | |
| 2007/0261027 A1 | 11/2007 | Dhanakshirur et al. | |
| 2007/0271277 A1 | 11/2007 | Ivan et al. | |
| 2008/0059630 A1 | 3/2008 | Sattler et al. | |
| 2008/0114700 A1 | 5/2008 | Moore et al. | |
| 2008/0126397 A1 | 5/2008 | Alexander et al. | |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetain et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0270372 A1 | 10/2008 | Hsu et al. | |
| 2008/0288944 A1 | 11/2008 | Coqueret et al. | |
| 2008/0313282 A1* | 12/2008 | Warila et al. | 709/206 |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 | 5/2009 | Lane et al. | |
| 2009/0157630 A1* | 6/2009 | Yuan | 707/3 |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0204662 A1* | 8/2009 | Meo | 709/203 |
| 2009/0210390 A1 | 8/2009 | Lane | |
| 2009/0313335 A1* | 12/2009 | Heidasch | 709/206 |
| 2010/0082387 A1 | 4/2010 | Cao et al. | |
| 2010/0106656 A1 | 4/2010 | Sheth et al. | |
| 2010/0146617 A1* | 6/2010 | Betts et al. | 726/12 |
| 2010/0161629 A1 | 6/2010 | Palanisamy et al. | |
| 2010/0228693 A1* | 9/2010 | Dawson et al. | 706/12 |
| 2011/0035391 A1 | 2/2011 | Werner et al. | |
| 2011/0153292 A1 | 6/2011 | Lane et al. | |
| 2011/0153293 A1 | 6/2011 | Coldicott et al. | |
| 2011/0153608 A1 | 6/2011 | Lane et al. | |
| 2011/0153610 A1 | 6/2011 | Carrato et al. | |
| 2011/0153767 A1 | 6/2011 | Coldicott et al. | |
| 2011/0238610 A1 | 9/2011 | Lee et al. | |

OTHER PUBLICATIONS

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

Chen, D-W. et al.; "A P2P based Web service discovery mechanism with bounding deployment and publication"; Chinese Journal of Computers; vol. 28; No. 4; pp. 615-626; Apr. 2005.

Lee, J. et al.; "Semantic and Dynamic Web Serivce of SOA bsed Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2".

Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F".

Building SOAa applications with reusable assets, Part 3: WS response template pattern, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2F".

"System and Method for Distributed Web Service Adaptation using Aspect oriented Programming", IBM Technical Disclosure Bulletin, Sep. 15, 2008, pp. 1-3.

(56) References Cited

OTHER PUBLICATIONS

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

\* cited by examiner

Fig. 5 *Service Model*

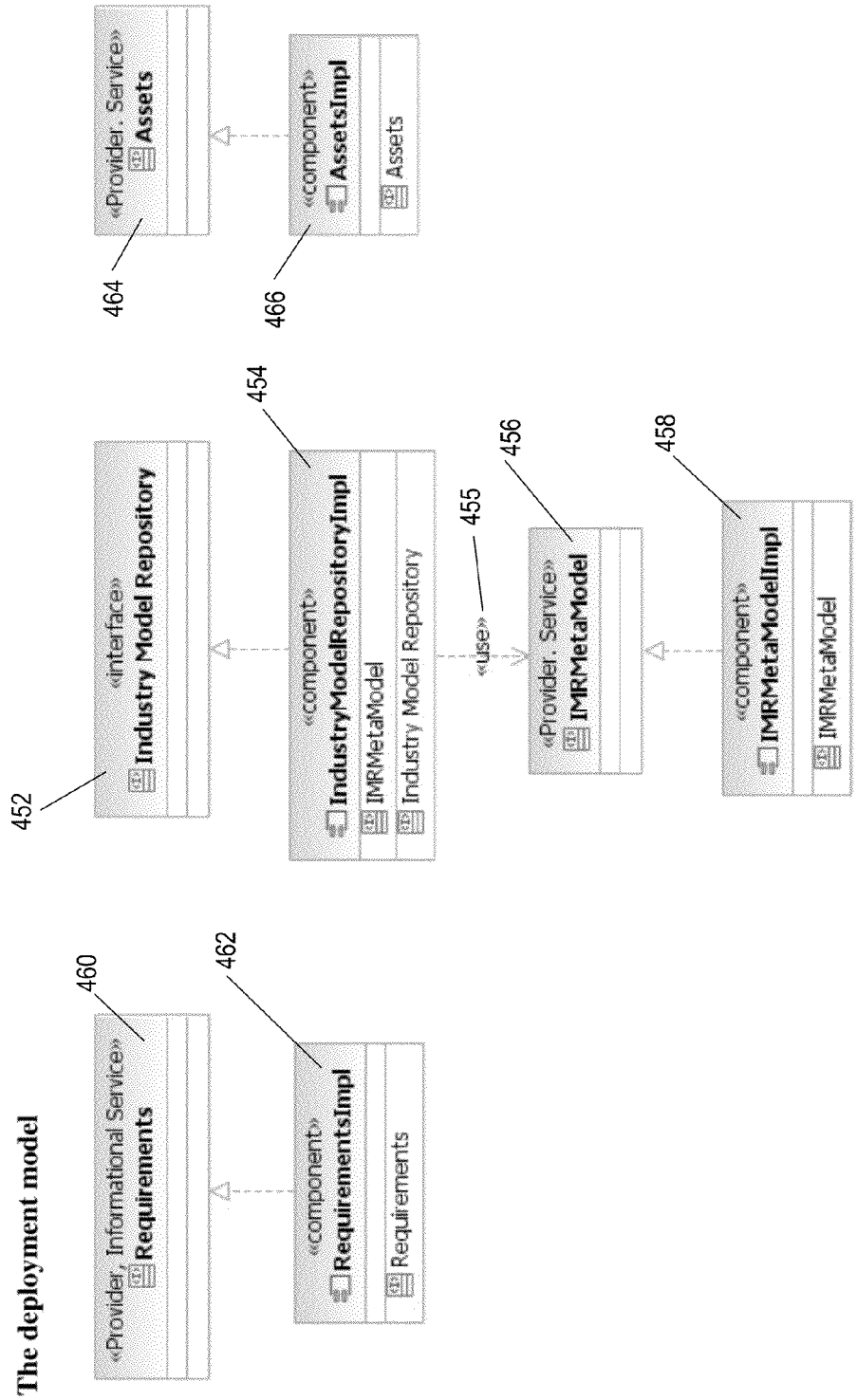
Fig. 8  The deployment model

RECOGNITION OF AND SUPPORT FOR MULTIPLE VERSIONS OF AN ENTERPRISE CANONICAL MESSAGE MODEL

BACKGROUND OF THE INVENTION

The present invention relates to meta models, and more specifically to recognition of and support for multiple versions of an enterprise conical message model at design and runtime.

Support of a conical message model within an enterprise is an important part of software architecture design pattern of service oriented architecture. By standardizing a common message model across the messaging infrastructure and using this message model to define the service definition, the level of complexity inherent in integration as an enterprise transforms to be more service oriented is greatly reduced. Thus, an enterprise can transform from complex and unwieldy point to point integrations across different service definition and message models to a much more scalable hub and spoke architecture where the conical enterprise message model is standardized.

Often times there is need for support of different versions of the canonical message model. Typically for an enterprise message mode, an enterprise will standardize on some industry vertical message model. Typically this is a "point in time" decision and the enterprise will standardize on a particular version of the message model. However, over time the message model will change as new features are added. The enterprise cannot compensate for the different versions of the message models.

SUMMARY OF THE INVENTION

According to one embodiment of the present invention a method of recognizing and supporting multiple versions of a canonical message model in a service oriented architecture industry model repository is provided comprising determining differences between at least one first version of a canonical message model and at least one other version of the canonical message model; mapping the differences between the at least one first version of a canonical message model and the at least one other version of the canonical message model to the SOA IMR; and providing the mapping of the differences between the at least one first version of a canonical message model and the at least one other canonical message model to a message access service, mapping of differences between the at least one first version of a canonical message model and the at least one other version canonical message model is applied and updated to the later of the at least one first version of a canonical message model and the at least one other version of the canonical message model to support the versions of the canonical message models seamlessly.

BRIEF DESCRIPTION OF THE SEVERAL VIEWS OF THE DRAWINGS

FIG. 8 shows a deployment model of the SOA IMR.

DETAILED DESCRIPTION OF THE INVENTION

Figure 1:
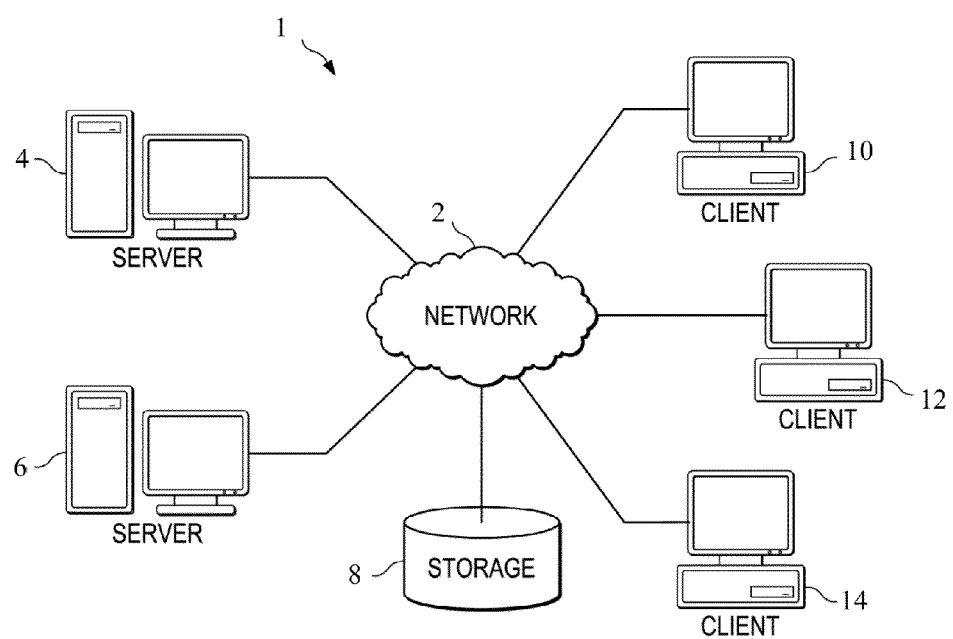
FIG. 1 is a computer network in which illustrative embodiments may be implemented.
Figure 2:
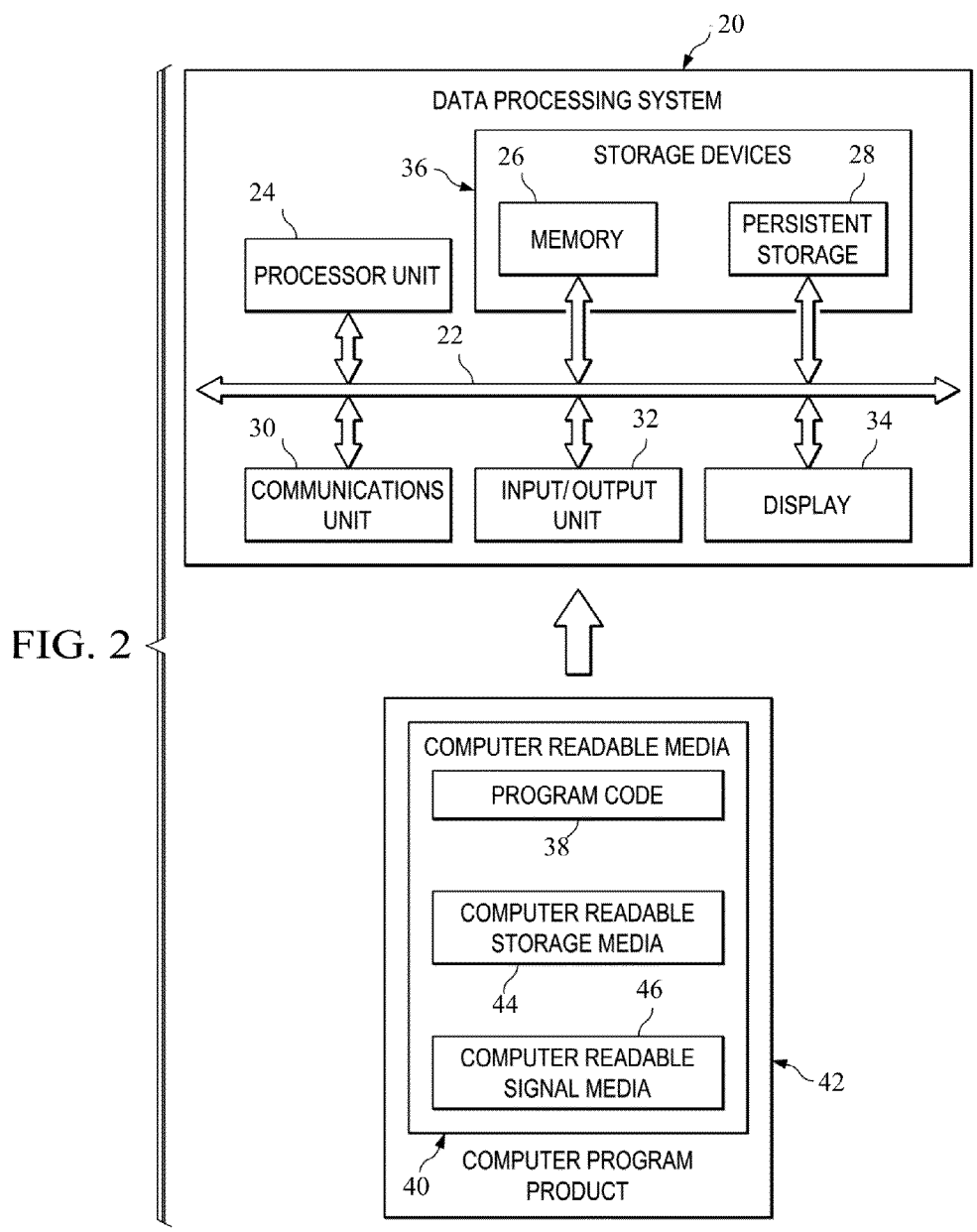
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 110, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code located in network data processing system 1 may be stored on a computer recordable storage medium and downloaded to a data processing system or other device for use. For example, program code may be stored on a computer recordable storage medium on server 4 and downloaded to client 10 over network 2 for use on client 10.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multiprocessor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples. The computer readable media also may take the form of non-tangible media, such as communication links or wireless transmissions containing the program code.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
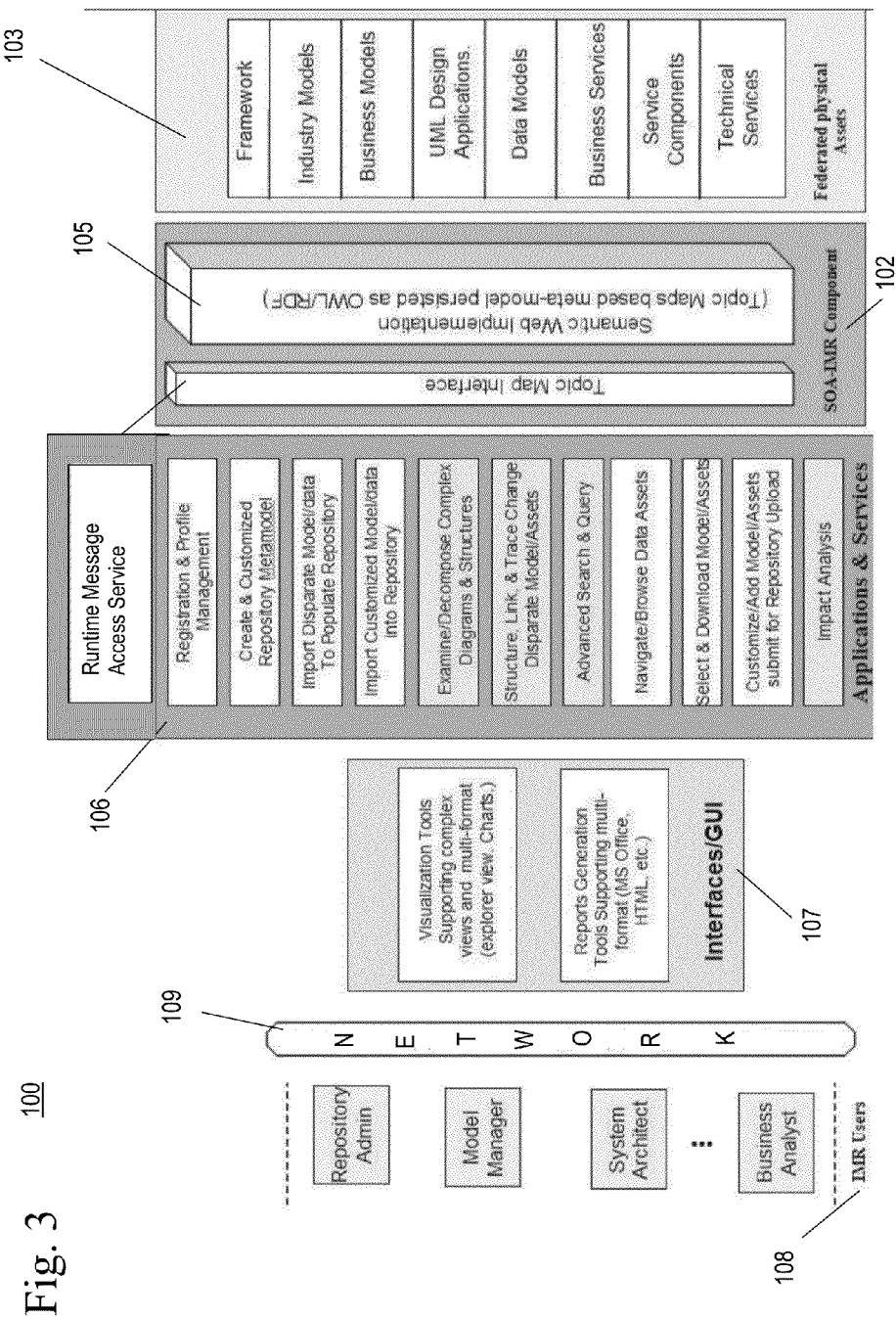
FIG. 3 shows an overview of an industry model repository (IMR) solution architecture system including a service oriented architecture (SOA) industry model repository (IMR) component.

FIG. 3 shows the IMR architecture system 100 which may be part of the network data processing system 1 shown in FIG. 1, which includes a service oriented architecture (SOA) industry model repository (IMR) component 102. The SOA-IMR component 102 provides tools to facilitate the consumption and reuse of the model assets through topic map IMR meta model creation and topic map interface 104 and semantic web implementation 105 which represent and implement the IMR meta models using semantics provide by the OWL language. The SOA IMR component 102 is discussed in further detail in an application entitled, "SERVICE ORIENTED ARCHITECTURE INDUSTRY MODEL REPOSITORY META-MODEL WITH A STANDARD BASED INDEX" filed concurrently with the present application. This application is hereby incorporated by reference. Block 105 is described in greater detail below.

The IMR architecture system 100 includes federated physical model assets 103 that are stored in different types of repositories depending on the model driven framework tools and products that are being deployed by the system. The federated physical assets may include framework, industry models, business models, Unified Modeling Language (UML) design applications, data models, business services, service components, and technical services. The federated physical assets are not limited to the assets shown in FIG. 3.

Applications and services 106 are provided to IMR users 108 through the network 109 using interfaces 107. The interfaces used by the IMR users 108 includes reports generation and tools supporting multi-formats and visualization tools supporting complex views. The applications and services 106 may include runtime message access service, registration and profile management; creating and customizing repository meta model, importing customized and disparate model/data into the depository, examining/decomposing complex diagrams and structures, structure, link, and trace change disparate model/assets; advanced search and query, navigate/browse data assets; select and download model/assets, customize/add models/assets submit for repository upload; and impact analysis. The application and services are not limited to the assets shown in FIG. 3. The applications and services are described in greater detail in applications entitled "FRAMEWORK TO POPULATE AND MAINTAIN A SERVICE ORIENTED ARCHITECTURE INDUSTRY MODEL", "MANAGING AND MAINTAINING SCOPE IN A SERVICE ORIENTED ARCHITECTURE INDUSTRY MODEL REPOSITORY", "IMPLEMENTING SERVICE ORIENTED ARCHITECTURE INDUSTRY MODEL REPOSITORY USING SEMANTIC WEB TECHNOLOGIES" filed concurrently with the present application. These applications are hereby incorporated by reference. The interfaces 107 are further described in greater detail in an application entitled, "SERVICE ORIENTED ARCHITECTURE INDUSTRY MODEL REPOSITORY META-MODEL WITH A STANDARD BASED INDEX" filed concurrently with the present application and hereby incorporated by reference.

The IMR users 108 may include but are not limited to repository administrator, model manager, system architect, and business analyst.

Figure 4:
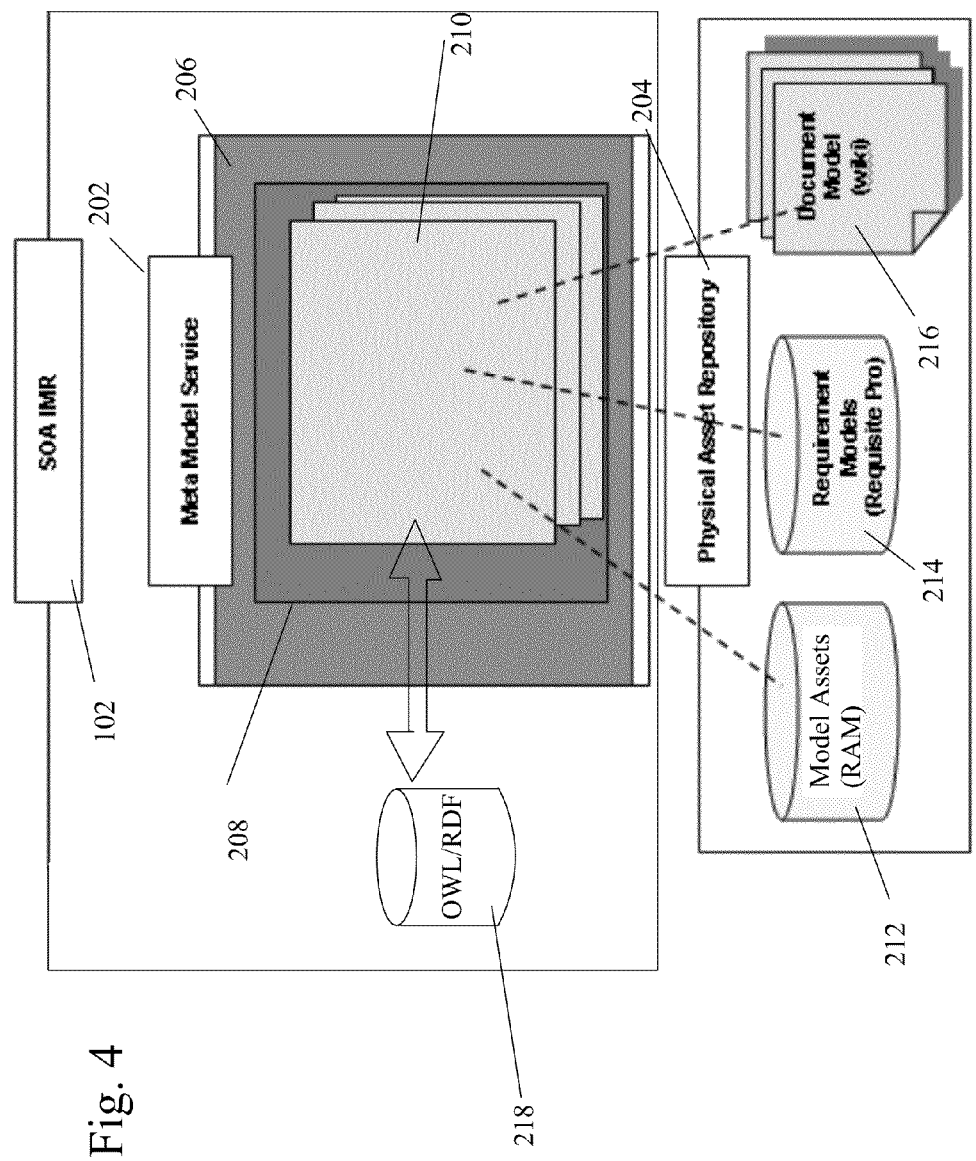
FIG. 4 shows an overview of a service oriented architecture (SOA) industry model repository (IMR) meta-model with OWL/RDF maps and vertical scoping.

FIG. 4 shows a service oriented architecture (SOA) industry model repository (IMR) component 102 in greater detail. The SOA IMR component 102 includes a meta model service 202 associated with the physical asset repository. Within the meta model service 202 is a meta-meta-meta model 206 with a topic map based index, an information model repository (IMR) common meta-meta model 208 and at least one topic map meta model 210 with data specific to a particular topic or industry vertical. The topic map meta model 210 is associated with the physical asset repositories which may include but are not limited to repository 204 of model assets (RAM) 212, requirement models 214, and document models (wiki) 216.

The internal meta model service 202 of the SOA IMR component 102 is the SOA IMR meta-model service using ISO Standard topic map meta models 210. Topic Maps map both web and real-world information resources, by reifying real-world resources as "subjects" and creating "topic" constructs to capture their characteristics and relationships with other topics and subjects. By using the topic maps meta models 206, 208, and 210 as the repository internal meta model, a common meta model service interface 202 allow users to programmatically access, manage, and maintain these meta models.

Topic Maps are an ISO/IEC standard (ISO 13250-1) for mapping both web and real-world information resources, by reifying real-world resources as "subjects", and creating "topic" constructs to capture their characteristics and relationships with other topics and subjects.

The SOA IMR meta model service 202 maps or implements the ISO topic map meta models 210 to a web ontology language (OWL) representation of the topic map. The industry model repository (IMR) provides the context for the implementation of the ISO topic map meta models 210 to the OWL representation of the topic maps. The OWL representation of the topic map is stored in a resource description framework (RDF) semantic web repository 218.

Figure 5:
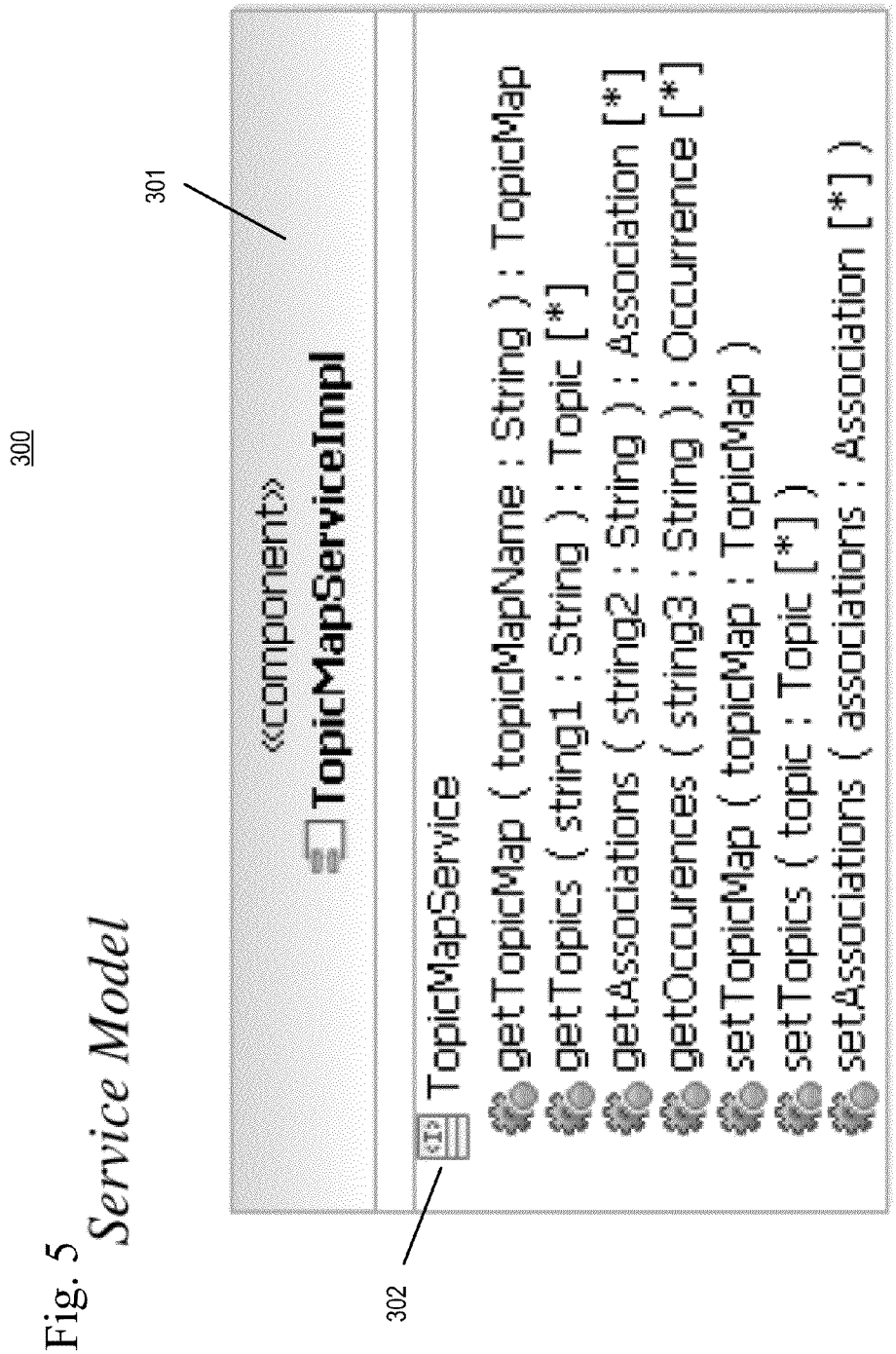
FIG. 5 shows a service model of the SOA IMR.
Figure 6:
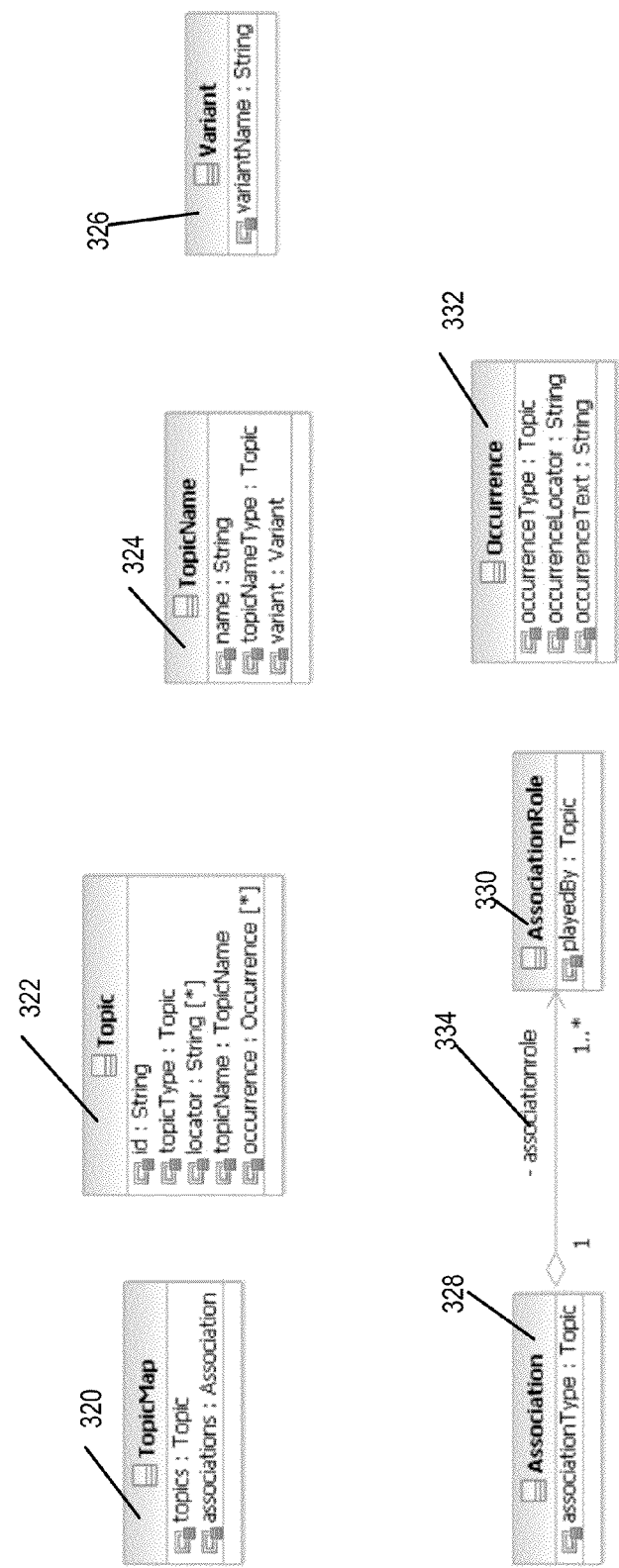
FIG. 6 shows a message model of the SOA IMR.

The SOA IMR meta model has create, read update, and delete (CRUD) access through the service model and message models of FIGS. 5 and 6. The interface and deployment of the service and message models are shown in FIGS. 7 and 8 respectively.

The service model 300 shown in FIG. 5 includes a TopicMapServiceImpl component 301 with a TopicMapService port 302 and numerous operations including getting the TopicMap, Topics, Associations, and Occurrences and setting the TopicMap, Topics, and Associations. The service model is not limited to the operations shown.

FIG. 6 shows messages that the service model 300 will send and receive in a message model 318. The messages pertain to TopicMap 320, Topic 322, TopicName 324, Association 328 and AssociationRole 330, Occurrence 332, and Variant 326. Association 328 is associated 334 with AssociationRole 330.

Figure 7:
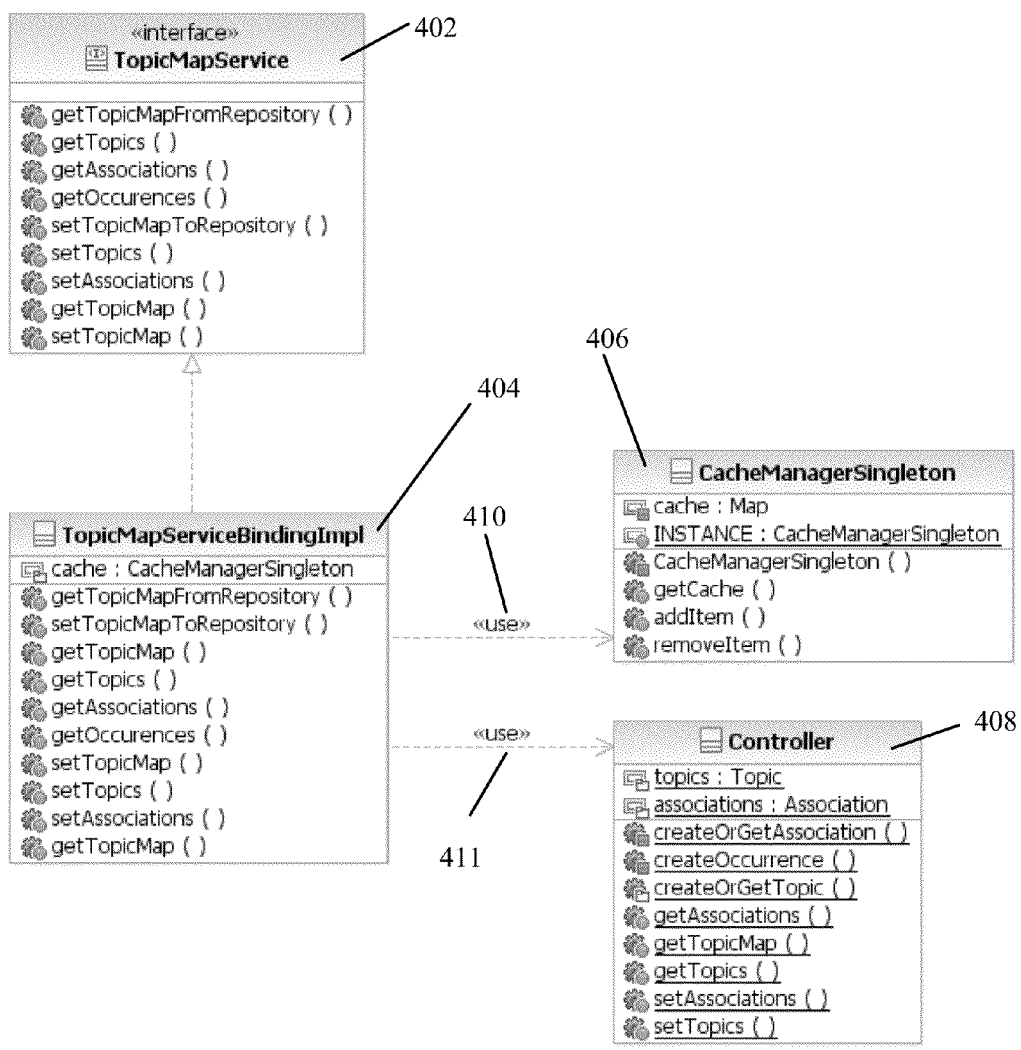
FIG. 7 shows a UML class diagram exhibiting an example of a Java™ implementation of the SOA IMR meta data management interface.

FIG. 7 shows a UML class diagram exemplifying a Java™ implementation of the SOA IMR interface. The TopicMapService port interface 402 is implemented by the TopicMapServiceBindingImpl 404. The TopicMapServiceBindingImpl 404 uses 410, 411 a CacheManagerSingleton 406 to add and remove an item from cache and a Controller 408 to create or get Associations, Occurrence, Topics, TopicMap and set Associations and Topics.

In one embodiment of the present invention supports a canonical messaging model or enterprise and provides recognition of and support for multiple versions of the model or enterprise for a service oriented architecture (SOA) industry model repository (IMR). The industry model repository tracks the deltas or changes between the latest or most current canonical message model and the various older versions of the models. These deltas or changes provide mapping data to runtime instantiations to support the latest or most current version of the model and the other various older versions of the message model seamlessly.

The topic maps meta models 210 are applied to managing and mapping the different message model versions at run time on a messaging infrastructure.

For example, if a message model has two versions, in a first step the different models versions are ingested using the framework. An IMR user 108 will access Applications & Services component 106 and use its service request "Structures, Link, & Trace Change Model/Assets" to add the two versions of the message model to IMR repositories and create the appropriate linkage and mapping between the two models.

The message model with the differences between version one and two is ingested using the SOA IMR component 102.

At runtime the SOA IMR component 102 could be accessed by a runtime Application & Services 106 "Runtime Message Access" service and be able to read the meta data for mapping from version one of the message model to version two of the message model. Then, at runtime, the "Runtime Message Access" service would then apply the transformation seamlessly, enabling the existing services and the IT infrastructure to work with the latest or most current version of the messaging model without modification or redeployment of the SOA IMR. After the "Runtime Message Access" service is complete, new services and components to leverage new capabilities that may be available in the latest or most current version of the message model are available to the SOA IMR without modifying or redeploying the SOA IMR.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of one or more embodiments of the present invention may be written in an object oriented programming language such as Java, Smalltalk, C++ or the like. However, the computer program code for carrying out operations of one or more embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in the Figures illustrate the architecture, functionality, and operation of possible implementations of systems, methods and computer program products according to various embodiments of the present invention. In this regard, each block may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for concurrently supporting multiple versions of an industry model repository (IMR) at runtime, the method comprising the steps of:
   semantically searching for available computing resources for a plurality of businesses conducting commerce in different industries, the available computing resources being searched using an industry model repository (IMR) architecture system comprising:
   (a) a first layer of abstraction comprising business specific model assets,
   (b) a second layer of abstraction comprising a plurality of topic maps, each of the topic maps comprising a set of topics of capturing characteristics and relationships among the business specific model assets and other topics, associations having a specific association type and association role played by a designated topic, and occurrences defining business specific instances of the business specific model assets, each of the occurrences having an occurrence type that links to a specific one of the topics and an occurrence locator indicating an accessible network location in a federated asset repository where a corresponding specific instance is stored; and
   (c) a third layer of abstraction comprising service oriented architecture ("SOA") program services that utilize the topic maps of the second layer to semantically search for the business specific model assets,
   wherein one or more of the services of the third layer of abstraction and linkages between the topic maps of the second layer of abstraction change over time as indicated by different versions of the industry model repository (IMR) of the second layer, wherein the searching step searches the computing resources based on linkages specific to a particular one of the different versions of the industry model repository (IMR), wherein a plurality of different versions are concurrently active at runtime and are used by different ones of the plurality of different businesses to access the business specific model assets of the first layer using the SOA program services of the third layer;
   a first computing device executing a first SOA service available for the searching and use at a first time when a first version of the different versions of the industry model repository (IMR) is available to the first computing device and a second SOA available for the searching and use at a second, later time using a second version of the industry model repository but not available for the searching and use at the first time;
   a second computing device executing the second SOA service at approximately the first time when the first version of the industry model repository is available to the second computing device, the second computing device executing the second SOA service at approximately the second time; and
   at least one computing device of the industry model repository (IMR) enabling the first computing device to execute the first SOA service at the first time, enabling the first computing device to execute the second SOA at the second time, enabling the second computing device to execute the second SOA service at approximately the first and at approximately the second time, thereby permitting concurrent use of different versions of the industry model repository (IMR) by different devices without modification or redeployment of the industry model repository (IMR).

2. The method of claim 1, further comprising:
   at least one of the one or more computing devices, defining and storing differences within the second layer of abstraction between the first version and the second version of the industry model repository within a data store accessible at the second layer of abstraction.

3. The method of claim 1, wherein software of the first and third layers of abstraction are able to concurrently access functions of the second layer of abstraction executing at different versions of the different versions of the industry model repository (IMR) without runtime problems, thereby permitting graceful upgrades of the different layers of abstraction without service interrupts.

4. The method of claim 1, further comprising:
   at least one of the one or more computing devices, determining from stored differences between the first version and the second version of the industry model repository that input parameters differ between a first SOA service for handling a received request and the second SOA version of a corresponding SOA service the first SOA being compliant with a first version of the IMR and the corresponding SOA service being compliant with the second version of the IMR, said corresponding SOA service being an updated version of the SOA service;
   at least one of the one or more computing devices at the second layer of abstraction receiving a message from the first layer or from the second layer, said message having input parameters compliant with the first SOA and not complaint with the second SOA, at runtime, programs executing at the second layer of abstraction dynamically modifying the message to be compatible with the corresponding SOA service using the stored differences; and
   conveying the modified message to the corresponding SOA service, which executes in the third layer of abstraction in response to receiving the modified message.

5. The method of claim 1, further comprising:
   at least one of the one or more computing devices, determining from stored differences between the first version and the second version of the industry model repository that parameters differ between a first business specific asset and a corresponding business specific asset, said corresponding business specific asset being updated for the second version of the industry model repository, said first business specific asset being for the first version of the industry model repository;

at least one of the one or more computing devices at the second layer of abstraction receiving a message from the third of second layer requesting the first business specific asset of the first layer, said message having parameters compliant with the first business specific asset and not for the corresponding business specific asset, at runtime, programs executing at the second layer of abstraction dynamically modifying the message to be compatible with the corresponding business specific asset using the stored differences; and utilizing the modified message to access the corresponding business specific asset.

6. The method of claim 1, wherein the program services of the third layer of abstraction comprise at least different types of services from a group of:
a runtime message access service;
a registration and profile management service;
a creating and customizing repository meta model;
an importing customized and disparate model/data into the repository;
a service for examining complex diagrams and structures;
a service for changing disparate ones of the business specific model assets;
a service for advanced search and query;
a service for navigating the business specific model assets;
a service to select and download the business specific model assets;
a service to customize the business specific model assets; and
a service for performing impact analysis.

7. The method of claim 1, wherein the business specific assets of the first layer of abstraction comprise at least three different types of business specific assets from a group of:
a framework asset;
an industry model asset;
a business model;
a Unified Modeling Language (UML) design application;
a data model;
a business service;
a service component; and
a technical service.

8. The method of claim 1, wherein the service oriented architecture ("SOA") SOA program services of the third layer of abstraction interface with user facing user interfaces, said user interfaces including user interfaces for report generation for the business specific assets and for complex view visualization tools for the business specific assets.

9. The method of claim 1, wherein the topic maps of the second layer are compliant with an International Organization for Standardization (ISO) standard for topic maps.

10. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to semantically search for available computing resources for a plurality of businesses conducting commerce in different industries, the available computing resources being searched using an industry model repository (IMR) architecture system comprising:
(a) a first layer of abstraction comprising business specific model assets,
(b) a second layer of abstraction comprising a plurality of topic maps, each of the topic maps comprising a set of topics of capturing characteristics and relationships among the business specific model assets and other topics, associations having a specific association type and association role played by a designated topic, and occurrences defining business specific instances of the business specific model assets, each of the occurrences having an occurrence type that links to a specific one of the topics and an occurrence locator indicating an accessible network location in a federated asset repository where a corresponding specific instance is stored; and
(c) a third layer of abstraction comprising service oriented architecture ("SOA") program services that utilize the topic maps of the second layer to semantically search for the business specific model assets,
wherein one or more of the services of the third layer of abstraction and linkages between the topic maps of the second layer of abstraction change over time as indicated by different versions of the industry model repository (IMR) of the second layer, wherein the searching step searches the computing resources based on linkages specific to a particular one of the different versions of the industry model repository (IMR), wherein a plurality of different versions are concurrently active at runtime and are used by different ones of the plurality of different businesses to access the business specific model assets of the first layer using the SOA program services of the third layer;
a first computing device executing a first SOA service available for the searching and use at a first time when a first version of the different versions of the industry model repository (IMR) is available to the first computing device and a second SOA available for the searching and use at a second, later time using a second version of the industry model repository but not available for the searching and use at the first time;
a second computing device executing the second SOA service at approximately the first time when the first version of the industry model repository is available to the second computing device, the second computing device executing the second SOA service at approximately the second time; and
at least one computing device of the industry model repository (IMR) enabling the first computing device to execute the first SOA service at the first time, enabling the first computing device to execute the second SOA at the second time, enabling the second computing device to execute the second SOA service at approximately the first and at approximately the second time, thereby permitting concurrent use of different versions of the industry model repository (IMR) by different devices without modification or redeployment of the industry model repository (IMR).

11. The computer system of claim 10, further comprising:
program instructions, stored on at least one of the one or more storage devices for execution by at least one of the one or more processors via at least one of the one or more memories, to define and store differences within the second layer of abstraction between the first version and the second version of the industry model repository within a data store accessible at the second layer of abstraction.

12. The computer system of claim 10, wherein software of the first and third layers of abstraction are able to concurrently access functions of the second layer of abstraction executing at different versions of the different versions of the industry model repository (IMR) without runtime problems, thereby permitting graceful upgrades of the different layers of abstraction without service interrupts.

13. The computer system of claim 10, further comprising:
program instructions, stored on at least one of the one or more storage devices for execution by at least one of the one or more processors via at least one of the one or more memories, to determine from stored differences between the first version and the second version of the industry model repository that input parameters differ between a first SOA service for handling a received request and the second SOA version of a corresponding SOA service the first SOA being compliant with a first version of the IMR and the corresponding SOA service being compliant with the second version of the IMR, said corresponding SOA service being an updated version of the SOA service;
program instructions, stored on at least one of the one or more storage devices for execution by at least one of the one or more processors via at least one of the one or more memories, to, at the second layer of abstraction, receive a message from the first layer or from the second layer, said message having input parameters compliant with the first SOA and not complaint with the second SOA, at runtime, programs executing at the second layer of abstraction dynamically modifying the message to be compatible with the corresponding SOA service using the stored differences; and
program instructions, stored on at least one of the one or more storage devices for execution by at least one of the one or more processors via at least one of the one or more memories, to convey the modified message to the corresponding SOA service, which executes in the third layer of abstraction in response to receiving the modified message.

14. The computer system of claim 10, further comprising:
program instructions, stored on at least one of the one or more storage devices for execution by at least one of the one or more processors via at least one of the one or more memories, to determine from stored differences between the first version and the second version of the industry model repository that parameters differ between a first business specific asset and a corresponding business specific asset, said corresponding business specific asset being updated for the second version of the industry model repository, said first business specific asset being for the first version of the industry model repository;
program instructions, stored on at least one of the one or more storage devices for execution by at least one of the one or more processors via at least one of the one or more memories, to, at the second layer of abstraction, receive a message from the third of second layer requesting the first business specific asset of the first layer, said message having parameters compliant with the first business specific asset and not for the corresponding business specific asset, at runtime, programs executing at the second layer of abstraction dynamically modifying the message to be compatible with the corresponding business specific asset using the stored differences; and program instructions, stored on at least one of the one or more storage devices for execution by at least one of the one or more processors via at least one of the one or more memories, to utilize the modified message to access the corresponding business specific asset.

15. A non-transitory computer-readable storage device comprising:
program instructions, stored on the storage device for execution by at least one of the one or more processors via at least one of the one or more memories, to semantically search for available computing resources for a plurality of businesses conducting commerce in different industries, the available computing resources being searched using an industry model repository (IMR) architecture system comprising:
(a) a first layer of abstraction comprising business specific model assets,
(b) a second layer of abstraction comprising a plurality of topic maps, each of the topic maps comprising a set of topics of capturing characteristics and relationships among the business specific model assets and other topics, associations having a specific association type and association role played by a designated topic, and occurrences defining business specific instances of the business specific model assets, each of the occurrences having an occurrence type that links to a specific one of the topics and an occurrence locator indicating an accessible network location in a federated asset repository where a corresponding specific instance is stored; and
(c) a third layer of abstraction comprising service oriented architecture ("SOA") program services that utilize the topic maps of the second layer to semantically search for the business specific model assets,
wherein one or more of the services of the third layer of abstraction and linkages between the topic maps of the second layer of abstraction change over time as indicated by different versions of the industry model repository (IMR) of the second layer, wherein the searching step searches the computing resources based on linkages specific to a particular one of the different versions of the industry model repository (IMR), wherein a plurality of different versions are concurrently active at runtime and are used by different ones of the plurality of different businesses to access the business specific model assets of the first layer using the SOA program services of the third layer;
a first computing device executing a first SOA service available for the searching and use at a first time when a first version of the different versions of the industry model repository (IMR) is available to the first computing device and a second SOA available for the searching and use at a second, later time using a second version of the industry model repository but not available for the searching and use at the first time;
a second computing device executing the second SOA service at approximately the first time when the first version of the industry model repository is available to the second computing device, the second computing device executing the second SOA service at approximately the second time; and
at least one computing device of the industry model repository (IMR) enabling the first computing device to execute the first SOA service at the first time, enabling the first computing device to execute the second SOA at the second time, enabling the second computing device to execute the second SOA service at approximately the first and at approximately the second time, thereby permitting concurrent use of different versions of the industry model repository (IMR) by different devices without modification or redeployment of the industry model repository (IMR).

16. The storage device of claim 15, further comprising:
program instructions, stored on the storage device, to define and store differences within the second layer of abstraction between the first version and the second version of the industry model repository within a data store accessible at the second layer of abstraction.

17. The storage device of claim 15, wherein software of the first and third layers of abstraction are able to concurrently access functions of the second layer of abstraction executing at different versions of the different versions of the industry model repository (IMR) without runtime problems, thereby permitting graceful upgrades of the different layers of abstraction without service interrupts.

18. The storage device of claim 15, further comprising:
program instructions, stored on the storage device, to determine from stored differences between the first version and the second version of the industry model repository that input parameters differ between a first SOA service for handling a received request and the second SOA version of a corresponding SOA service the first SOA being compliant with a first version of the IMR and the corresponding SOA service being compliant with the second version of the IMR, said corresponding SOA service being an updated version of the SOA service;
program instructions, stored on the storage device, to, at the second layer of abstraction, receive a message from the first layer or from the second layer, said message having input parameters compliant with the first SOA and not complaint with the second SOA, at runtime, programs executing at the second layer of abstraction dynamically modifying the message to be compatible with the corresponding SOA service using the stored differences; and
program instructions, stored on the storage device, to convey the modified message to the corresponding SOA service, which executes in the third layer of abstraction in response to receiving the modified message.

19. The storage device of claim 15, further
program instructions, stored on the storage device, to determine from stored differences between the first version and the second version of the industry model repository that parameters differ between a first business specific asset and a corresponding business specific asset, said corresponding business specific asset being updated for the second version of the industry model repository, said first business specific asset being for the first version of the industry model repository;
program instructions, stored on the storage device, to, at the second layer of abstraction, receive a message from the third of second layer requesting the first business specific asset of the first layer, said message having parameters compliant with the first business specific asset and not for the corresponding business specific asset, at runtime, programs executing at the second layer of abstraction dynamically modifying the message to be compatible with the corresponding business specific asset using the stored differences; and
program instructions, stored on the storage device, to utilize the modified message to access the corresponding business specific asset.

* * * * *